(12) United States Patent
Wei et al.

(10) Patent No.: US 11,261,387 B2
(45) Date of Patent: Mar. 1, 2022

(54) FUEL OIL CONVERSION

(71) Applicant: Saudi Arabian Oil Company, Dhahran (SA)

(72) Inventors: Eric Wei, Dhahran (SA); Vinod Ramaseshan, Dhahran (SA); Donald Saunders, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/863,765

(22) Filed: Apr. 30, 2020

(65) Prior Publication Data
US 2021/0024841 A1 Jan. 28, 2021

Related U.S. Application Data

(60) Provisional application No. 62/877,560, filed on Jul. 23, 2019.

(51) Int. Cl.
*C10G 67/14* (2006.01)
*B01J 19/24* (2006.01)
(Continued)

(52) U.S. Cl.
CPC .............. *C10G 67/14* (2013.01); *B01D 3/06* (2013.01); *B01D 3/10* (2013.01); *B01J 19/245* (2013.01);
(Continued)

(58) Field of Classification Search
CPC ...... B01D 5/0015; B01D 5/003; B01D 5/009; B01D 3/06; B01D 3/10; C10G 1/02;
(Continued)

(56) References Cited

U.S. PATENT DOCUMENTS 3,287,254 A 11/1966 Paterson et al.
5,958,365 A 9/1999 Liu
(Continued)

OTHER PUBLICATIONS

PCT International Search Report and Written Opinion in International Application No. PCT/US2020/042902, dated Sep. 22, 2020, 13 pages.

*Primary Examiner* — Ellen M McAvoy
*Assistant Examiner* — Chantel L Graham
(74) *Attorney, Agent, or Firm* — Fish & Richardson P.C.

(57) ABSTRACT

A system for processing a stream including fuel oil includes an atmospheric flash column for receiving the stream as feedstock and separate the stream into an atmospheric flash distillate stream and an atmospheric flash residue stream. The system includes a vacuum flash column for receiving the atmospheric flash residue stream and separating the atmospheric flash residue stream into a vacuum flash distillate stream, a vacuum flash residue stream, and a vacuum gas oil stream. The system includes a first hydrocracking unit for receiving and processing at least a portion of the vacuum flash residue stream to produce an intermediate stream and a slurry. The system includes a second hydrocracking unit for receiving and processing the vacuum gas oil stream and the intermediate stream to produce a naphtha product and a light ends product. The system includes a pelletization unit for receiving and processing the slurry to produce a pelletized product.

17 Claims, 6 Drawing Sheets

(51) Int. Cl.
  *C10L 5/08* (2006.01)
  *C10L 1/08* (2006.01)
  *C10L 5/36* (2006.01)
  *B01D 3/06* (2006.01)
  *B01D 3/10* (2006.01)

(52) U.S. Cl.
  CPC ...... *C10L 1/08* (2013.01); *C10L 5/08* (2013.01); *C10L 5/363* (2013.01); *B01J 2219/0004* (2013.01); *C10G 2300/202* (2013.01); *C10G 2400/04* (2013.01); *C10L 2200/0446* (2013.01); *C10L 2270/026* (2013.01); *C10L 2290/30* (2013.01); *C10L 2290/543* (2013.01)

(58) Field of Classification Search
  CPC .... C10G 1/10; C10G 2300/1003; C10G 7/00; C10G 21/003; C10G 2300/202; C10G 2400/04; C10G 45/02; C10G 65/10; C10G 65/18; C10G 67/049; C10G 67/14; B01J 19/245; B01J 2208/00539; B01J 2208/00672; B01J 2219/0004; B01J 8/02; C10L 1/08; C10L 2200/0446; C10L 2270/026; C10L 2290/30; C10L 2290/543; C10L 5/08; C10L 5/363
  See application file for complete search history.

(56) References Cited

U.S. PATENT DOCUMENTS

| | | |
|---|---|---|
| 8,110,090 B2 | 2/2012 | Zimmerman et al. |
| 2006/0010712 A1* | 1/2006 | Carin ............ C05F 7/00 34/443 |
| 2010/0320122 A1 | 12/2010 | Baldassari et al. |
| 2013/0087481 A1 | 4/2013 | Heraud et al. |
| 2019/0062655 A1* | 2/2019 | Housmans ........ C10G 69/02 |

* cited by examiner

FUEL OIL CONVERSION

CLAIM OF PRIORITY

This application claims priority to U.S. Provisional Patent Application Ser. No. 62/877,560, filed on Jul. 23, 2019, the entire contents of which is hereby incorporated by reference.

TECHNICAL FIELD

This disclosure relates to conversion of fuel oil.

BACKGROUND

Residuum produced in refineries are sometimes used to produce refinery fuel oil, for example, by blending with cutter stock (typically distillate or heavy gas oil) to produce transportable and marketable fuel oil. Some refineries utilize thermal cracking technology to improve the economic value of their product yields and to improve the viscosity of the straight run residual that is produced from crude oil. Fuel oil produced by such operations are also known as cracked fuel oil. Cracked fuel oil and blends that include cracked fuel oil are typically limited to use as low value fuel, for example, as marine bunker fuel, power plant fuel, or industrial utility fuel.

SUMMARY

This disclosure describes technologies relating to conversion of fuel oil. As used in this disclosure, fuel oil can include products that include fuel oil, such as cracked fuel oil or cracked fuel oil blends. In some implementations, fuel oil is converted into fuel with increased value, petrochemical feedstock, or both. The subject matter described in this disclosure can be implemented in particular implementations, so as to realize one or more of the following advantages. The systems and methods described can be implemented to process feedstocks that are 100% thermally cracked residue. The systems and methods described can be implemented to convert fuel oil that include contaminants, such as sulfur, nitrogen, metal, and ash. The systems and methods described can be implemented to convert fuel oil into high value products, such as transportation fuels, petrochemical feedstock, or both with a conversion rate of 80% or greater. The systems and methods described can be implemented to convert fuel oil at industrial processing scales, for example, more than 100 million barrels per day (MBD) of fuel oil with a maximum viscosity of 380 centistoke (cSt, which can be related to sulfur content). The systems and methods described can be implemented with the addition of hydrogen, thereby improving the physical properties of the fuel oil. The systems and methods described can be implemented to produce diesel, steam cracker feed, and aromatics from fuel oil. The systems and methods described can be implemented to increase propylene production and finished gasoline production. The systems and methods described can be implemented to expand the processing scale of a refinery, thereby lowering the average overall operating costs and improving the economic value of future projects. The systems and methods described can be implemented as a standalone facility or an addition to an existing facility. The systems and methods described can be implemented to allow for improved economies of scale based on the ability to directly process fuel oil as a cheap supplemental feed due to being readily available in the marketplace.

Certain aspects of the subject matter described can be implemented as a system for processing a stream including fuel oil. The system includes a flash column configured to receive the stream as feedstock and separate the stream into a flash distillate stream and a flash residue stream. The system includes a vacuum column configured to receive the flash residue stream and separate the flash residue stream into a vacuum distillate stream, a vacuum gas oil stream, and a vacuum residue stream. The system includes a first hydrocracking unit configured to receive and process at least a portion of the vacuum residue stream to produce an intermediate stream and a slurry. The system includes a second hydrocracking unit configured to receive and process the vacuum gas oil stream and the intermediate stream to produce a naphtha product and a light ends product. The second hydrocracking unit is configured to receive and process the vacuum gas oil stream and the intermediate stream to produce an unconverted oil stream that can be recycled to the first hydrocracking unit. The system includes a pelletization unit configured to receive and process the slurry to produce a pelletized product. The pelletization unit is configured to receive and process the slurry to produce a recovered oil stream that can be recycled to the first hydrocracking unit.

This, and other aspects, can include one or more of the following features.

The first hydrocracking unit can be configured to receive a first stream comprising hydrogen to promote the production of the intermediate stream, and the second hydrocracking unit can be configured to receive a second stream comprising hydrogen to promote the production of the naphtha product and the light ends product.

The second hydrocracking unit can be configured to receive and process the vacuum flash distillate stream and the atmospheric flash distillate stream.

The system can include a solvent de-asphalting unit configured to receive and process the vacuum flash residue to produce a de-asphalted residue stream and a pitch stream. The first hydrocracking unit can be configured to receive and process the pitch stream, and the second hydrocracking unit can be configured to receive and process the de-asphalted residue stream.

The system can include a hydrotreating unit configured to receive and process the vacuum flash distillate stream and the atmospheric flash distillate stream to produce an ultralow sulfur diesel product.

The hydrotreating unit can be configured to receive a third stream comprising hydrogen to promote the production of the ultra-low sulfur diesel product.

The system can include a solvent de-asphalting unit configured to receive and process the vacuum flash residue to produce a de-asphalted residue stream and a pitch stream. The first hydrocracking unit can be configured to receive and process the pitch stream, and the second hydrocracking unit is configured to receive and process the de-asphalted residue stream.

Certain aspects of the subject matter described can be implemented as a method. A stream including fuel oil is received as feedstock. The stream is separated into a flash distillate stream and a flash residue stream. The flash residue stream is received. The flash residue is separated into a vacuum distillate stream, a vacuum gas oil stream, and a vacuum residue stream. At least a portion of the vacuum residue stream is processed to produce an intermediate stream and a slurry. The vacuum gas oil stream and the intermediate stream are processed to produce a naphtha product and a light ends product. The slurry is processed to produce a pelletized product.

This, and other aspects, can include one or more of the following features.

Processing the portion of the vacuum residue stream can be performed by a first hydrocracking unit. Processing the vacuum gas oil stream and the intermediate stream can be performed by a second hydrocracking unit and can result in producing an unconverted oil stream. Processing the slurry can be performed by a pelletization unit and can result in producing a recovered oil stream. The unconverted oil stream from the second hydrocracking unit and the recovered oil stream from the pelletization unit can be recycled to the first hydrocracking unit.

The production of the intermediate stream can be promoted by flowing a first stream including hydrogen to the first hydrocracking unit. The production of the naphtha product and the light ends product can be promoted by flowing a second stream including hydrogen to the second hydrocracking unit.

The vacuum flash distillate stream and the atmospheric flash distillate stream can be processed by the second hydrocracking unit.

The vacuum flash residue can be processed by a solvent de-asphalting unit to produce a de-asphalted residue stream and a pitch stream. The de-asphalted residue stream can be processed by the second hydrocracking unit.

Processing at least a portion of the vacuum flash residue stream can include processing the pitch stream by the first hydrocracking unit.

The vacuum flash distillate stream and the atmospheric flash distillate stream can be processed by a hydrotreating unit to produce an ultra-low sulfur diesel product.

The production of the ultra-low sulfur diesel product can be promoted by flowing a third stream including hydrogen to the hydrotreating unit.

The details of one or more implementations of the subject matter of this disclosure are set forth in the accompanying drawings and the description. Other features, aspects, and advantages of the subject matter will become apparent from the description, the drawings, and the claims.

DETAILED DESCRIPTION

Residuum produced in refineries can be used to produce refinery fuel oil by blending with cutter stock (typically distillate or heavy gas oil) to produce transportable and marketable fuel oil. Many refineries in the world lack the capability to fully convert their residue and are resigned to producing low value refinery fuel oil. These refineries are considered to operate in partial conversion mode. While investment in new resid conversion facilities is often discussed, the level of capital required is often prohibitive for many small or medium sized refineries. As a result, small and medium sized refineries that rely on fuel oil sales may be faced with inevitable closure or rationalization in the marketplace.

In order to minimize or otherwise reduce the cost of fuel oil production, some partial conversion refineries use thermal cracking technology as a way to improve the economic value of their product yields and to improve the viscosity of the straight run resid produced from crude oil. The resid viscosity improvement effectively lowers the amount of cutter stock that is required to produce a marketable and transportable fuel oil blend. Such refineries commonly can include both visbreaking and thermal cracking units. The fuel oil produced from these operations result in what is known as cracked fuel oil. While straight run residues (that is, residues that are not cracked) are also used to produce fuel oil, they are often co-mingled or mixed with cracked fuel oil, which can limit their future market use.

Cracked fuel oil and cracked fuel oil blends are typically limited to use as a low value fuel, for example, as marine bunker fuel, power plant fuel, or as industrial utility fuel. Cracked fuel oil can include large and unstable asphaltene molecules that can be prone to coking or fouling at the temperatures that would be required for re-processing (for example, temperatures exceeding 380 degrees Celsius (° C.) at atmospheric pressure). Because of this, the process of visbreaking or thermal cracking has sometimes been considered as a dead-end. Once the complex asphaltenes are produced by the thermal cracking process, the resid mix is usually consumed as low value fuel.

Commercially large quantities of cracked fuel oil blends are available and traded across the global oil market system. The systems and methods described can be implemented to process cracked fuel oil blends from the international marketplace. As such, the systems and methods described can allow for a new set of process investment cases that move beyond historical industry constraints. Cracked fuel oil feedstocks can be gathered across multiple refineries to achieve greater and more attractive investment scales for resid conversion.

As used in this disclosure, the term "stream" can include various hydrocarbon molecules, such as straight chain, branched or cyclical alkanes, alkenes, alkadienes, alkynes & aromatics and optionally other substances, such as gases and impurities. The stream can also include aromatic and non-aromatic compounds.

As used in this disclosure, the term "zone" can mean an area including one or more equipment items and/or one or more sub-zones. Equipment items can include one or more reactors or reactor vessels, heaters, coolers, exchangers, pipes, pumps, compressors, and controllers. Additionally, an equipment item, such as a reactor dryer or vessel, can further include one or more zones.

As used in this disclosure, the term "rich" can mean an amount of at least generally about 50% and preferably at least about 70%, by mole of a compound or class of compounds in a stream.

As used in this disclosure, the term "substantially" can mean an amount of at least generally about 80%, preferably at least about 90% and optimally at least about 99% by mole of a compound or class of compounds in a stream.

As used in this disclosure, the term "true boiling point" (TBP) can mean a test method for determining the boiling point of a material which corresponds to ASTM D2892 for the production of a liquefied gas, distillate fractions, and residuum of standardized quality on which analytical data can be obtained, and the determination of yields of the above fractions by both mass and volume from which a graph of temperature versus mass % distilled is produced using fifteen theoretical plates in a column with a 5:1 reflux ratio.

As used in this disclosure, the term "white oil" can mean a hydrocarbon product which has a TBP End Point less than about 370° C., for example, hydrocarbons in the liquefied petroleum gas (LPG), naphtha, and distillate range.

As used in this disclosure, the term "distillate" can mean a hydrocarbon which has a TBP range of from about 150° C. to about 370° C., for example, a kerosene and diesel product.

As used in this disclosure, the term "gas oil" can mean a hydrocarbon which has a TBP range of from about 370° C. to about 550° C., for example, derived as side cuts from a vacuum distillation column.

As used in this disclosure, the terms "residuum" or "residue" can mean any hydrocarbon which has a TBP greater than about 550° C., for example, derived as a bottom stream after flashing the lighter components from a fuel oil stream.

As used in this disclosure, the term "pitch" can mean the asphaltene rich stream from a solvent de-asphalting unit (SDU).

As used in this disclosure, the term "asphaltenes" can mean a heavy polar fraction and can be the residue which remains after the resins and oils have been separated from the feed residue fed to a SDU. Asphaltenes from vacuum resid can be generally characterized as follows: a Conradson or Ramsbottom carbon residue in a range of from about 15 weight percent (wt. %) to about 90 wt. % and a hydrogen to carbon (H/C) atomic ratio of 0.5 to 1.5. In some implementations, asphaltenes can contain from about 50 parts per million (ppm) to over 5000 ppm vanadium and from about 20 ppm to over 2000 ppm nickel. In some implementations, the sulfur concentration of asphaltenes can be in a range of from about 110% to about 350% greater than the concentration of sulfur in the residue oil feed oil to a deasphalter. In some implementations, the nitrogen concentration of asphaltenes can be in a range of from about 100% to about 350% greater than the concentration of nitrogen in the residue oil feed oil to the deasphalter.

As used in this disclosure, the term "resin oil" can mean an aromatic polar fraction which is an intermediate between the de-asphalted oil and asphaltene (pitch) separated from the feed residue fed to a SDU. Resins can be denser (that is, heavier) than de-asphalted oil (DAO), but lighter than the aforementioned asphaltene. The resin product typically includes more aromatic hydrocarbons with aliphatic substituted side chains and can also include metals, such as nickel and vanadium. In some implementations, the resins include the material from which asphaltenes and DAO have been removed.

As used in this disclosure, the term "de-asphalted oil" (DAO) can mean the least dense products produced in a SDU and can include saturated aliphatic, alicyclic, and aromatic hydrocarbons. In some implementations, de-asphalted oil includes less than about 30% aromatic carbon and relatively low levels of heteroatoms excluding sulfur. De-asphalted oil from vacuum resid can be generally characterized as follows: a Conradson or Ramsbottom carbon residue of 1 to less than about 12 wt. % and a hydrogen to carbon (H/C) ratio in a range of from about 1% to about 2%. In some implementations, de-asphalted oil can contain about 100 ppm or less, preferably less than 5 ppm, and most preferably less than 2 ppm of vanadium and 100 ppm or less, preferably less than 5 ppm, and most preferably less than 2 ppm of nickel. In some implementations, the sulfur and nitrogen concentrations of de-asphalted oil can be about 90% or less of the sulfur and nitrogen concentrations of the residue oil feed oil to the SDU.

As used in this disclosure, the term "distillate hydrotreating unit" (DHT) can mean a fixed bed catalytic process unit with the objective to produce an ultra-low sulfur diesel (ULSD) product stream which can be used as the main component to produce 10 ppm sulfur diesel, essentially meeting EN 590 (EURO V/EURO VI) specifications. The hydrotreating can be a implemented in a reaction temperature range of from 320° C. to 400° C. and a reaction pressure in the range of from 40 absolute bar (bara) to 170 bara (hydrogen partial pressure). With a liquid hourly space velocity of 1 per hour ($hr^{-1}$) to 10 $hr^{-1}$, the distillate products produced can meet a sulfur specification of less than 10 ppm by weight. In some implementations, the catalyst in the DHT is a heterogeneous fixed bed catalyst that includes at least one Group VIII metal (CAS Group VIIIB also referred to as IUPAC Groups 8-10, which include the iron family, cobalt family, and nickel family) and at least one Group VIB metal (CAS Group VIB also referred to as IUPAC Group 6, which includes the chromium family). In some implementations, the Group VIII metal is selected from the group consisting of iron, cobalt and nickel. In some implementations, the Group VIB metal is selected from the group consisting of molybdenum and tungsten. In some implementations, the Group VIII metal is present in an amount in the range of from about 2 wt. % to about 20 wt. %. In some implementations, the Group VIB metal is present in the amount in the range of from about 1 wt. % to about 25% wt. %. In some implementations, the at least one Group VIII metal and at least one Group VIB metal may be disposed on a support material, such as alumina with silica or alumina without silica.

As used in this disclosure, the term "hydrocracking unit" (HCU) can mean a fixed bed catalytic process unit used to convert distillate, gas oil range and de-asphalted oil to white oil products, for example, by either maximizing naphtha or ULSD. The hydrocracking can be implemented in a reaction temperature range of from about 360° C. to about 420° C. and a reaction pressure in the range of from about 70 bara to about 170 bara (hydrogen partial pressure). The conversion in the hydrocracking zone can be in the range of from about 50% to about 98%. The liquid hourly space velocity can be in a range of from about 0.5 $hr^{-1}$ to about 3 $hr^{-1}$. In some implementations, the conversion rate is about 95% with a two stage unit configuration. The HCU can include a heterogeneous fixed bed catalyst that includes at least one Group VIII metal and at least one Group VIB metal. In some implementations, the Group VIII metal is selected from a group consisting of iron, cobalt, and nickel. In some implementations, the Group VIB metal is selected from a group consisting of molybdenum and tungsten. In some implementations, the Group VIII metal can be present in the amount of about 2 wt. % to about 20 wt. %, and the Group VIB metal can be present in the amount in a range of from about 1 wt. % to about 25 wt. %. In some implementations, these metals are included on a support material, such as silica, alumina, or a mixture of these. Additional acidity in the form of zeolites can be present for hydrocracking catalysts and promoter. For example, Group XV oxides may be present for the residue conversion and hydrotreating catalysts, such as an oxide of phosphorus.

As used in this disclosure, the term "slurry hydrocracking unit" (SHCU) can mean the hydroconversion process of residue to white oil products and intermediates in a slurry bed reactor with a catalyst and/or an additive system. The conversion can be achieved by a combination of thermal and catalytic hydrocracking. The slurry bed hydroconversion can be implemented in a reaction temperature in a range of from about 400° C. to about 490° C. and a reaction pressure in a range of from about 100 bara to about 200 bara (hydrogen partial pressure) with a conversion in a range of from about 70% to about 98%. When a catalyst is employed in the SHCU, the catalyst can include a nano- or microparticle size catalyst that includes a Group VIII metal, a Group VIB metal, or both. In some implementations, the catalyst includes a Group VIII metal selected from the group consisting of iron, cobalt and nickel. In some implementations, catalyst includes a Group VIB metal selected from the group consisting of molybdenum and tungsten. In some implementations, the metals can be supported over a carbon particle. In some implementations, an additive may be substituted for the catalyst and can be based on carbon.

As used in this disclosure, the term "solvent de-asphalting" (SDA) can mean a liquid-liquid extraction unit for C3/C4/C5 and producing a DAO & resin (if needed) lighter cut from a residuum with asphaltene rejected in a pitch stream. For example, a majority of the saturates are extracted from a feed oil in the form of DAO and any asphaltene-range material is rejected with the pitch stream. In some implementations, the solvent to oil ratio in the SDA is between 3:1 to 8:1 with operation of the SDA being either under subcritical or supercritical pressure and temperature range of the solvent being used. In some implementations, the lift (production of DAO and resin, if produced) is in the range of from about 30% to about 75% of the residuum feed and optimally less 50%.

The manner in which the features and advantages of the implementations of systems and methods for converting fuel oil to white oil products, as well as others, may be understood in more detail by way of this disclosure which includes a description of the implementations (briefly summarized previously) in reference to the drawings, which form a part of this specification. It is noted, however, that the drawings illustrate only various implementations of the disclosure and are therefore not to be considered limiting of the present disclosure's scope, as it may include other effective implementations as well. Further, only major liquid product fluid streams have been shown and other streams (including hydrocarbon or otherwise) have not been shown for simplicity and their inclusion should be understood by those skilled in the art.

Figure 1A:
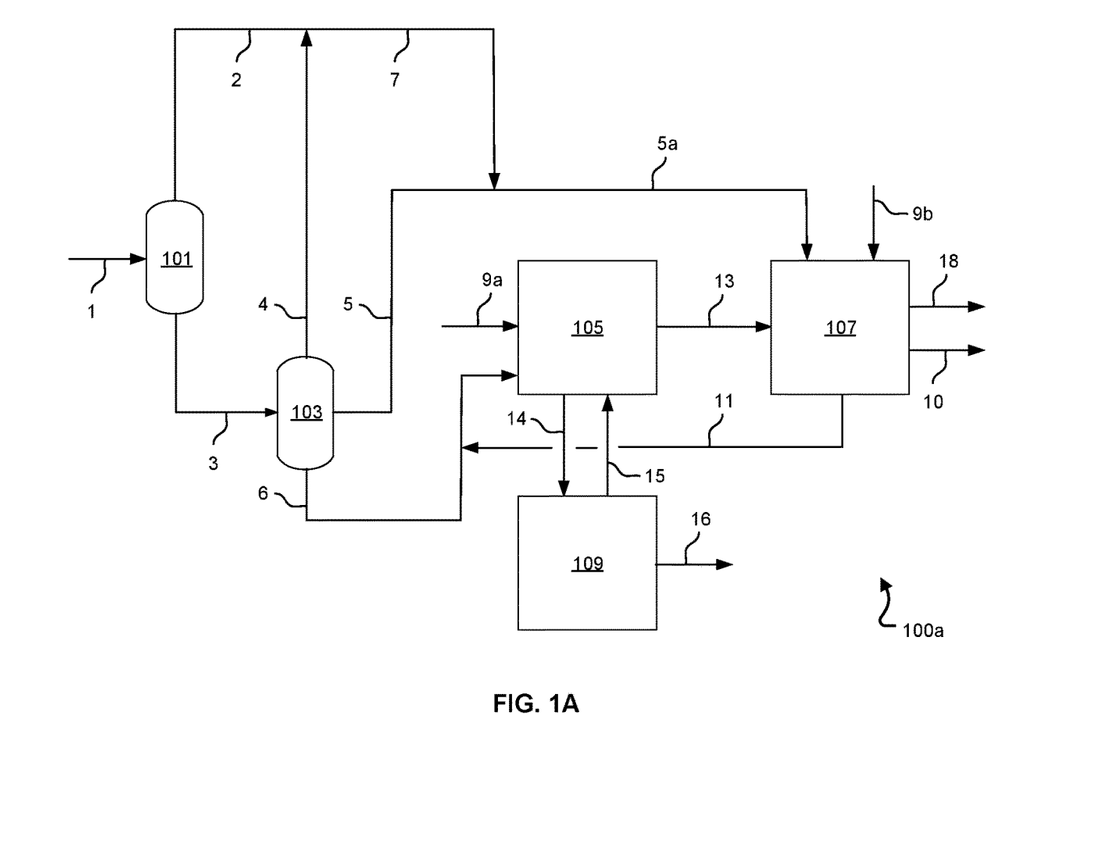
FIG. 1A is a schematic diagram of an example fuel oil conversion system.

FIG. 1A illustrates an example system 100a that can be used to convert fuel oil, for example, into fuel, petrochemical feedstock, or both. The system 100a includes a flash column 101 and a vacuum column 103. The flash column 101 and vacuum column 103 can be, for example, distillation columns. The flash column 101 can operate at a pressure near atmospheric pressure, for example, 1 bara, or at a vacuum pressure. In some implementations, a flash zone of the flash column 101 has an operating pressure within a range of from 30 millimeters of mercury (mmHg) to 760 mmHg. The flash column 101 is configured to receive a stream 1 including fuel oil as feedstock. In some implementations, the stream 1 includes fuel oil, cracked fuel oil, or a combination of these. For example, stream 1 includes a cracked fuel oil blend that also includes hydrocarbons other than cracked fuel oil. The flash column 101 is configured to separate the stream 1 into a flash distillate stream 2 and a flash residue stream 3. In some implementations, the flash distillate stream 2 has a boiling temperature that is less than about 360° C.

The vacuum column 103 can operate at a pressure less than atmospheric pressure. In some implementations, a flash zone of the vacuum column 103 has an operating pressure within a range of from 25 mmHg to 90 mmHg. The vacuum column 103 is configured to receive the flash residue stream 3. The vacuum column 103 is configured to separate the flash residue stream 3 into a vacuum distillate stream 4, a vacuum gas oil stream 5, and a vacuum residue stream 6. In some implementations, the flash distillate stream 2 and the vacuum distillate stream 4 can be combined to form a distillate stream 7.

In some implementations, the vacuum gas oil stream 5 has a boiling temperature in a range of from about 360° C. to about 550° C. In some implementations, the vacuum residue stream 6 has a boiling temperature that is greater than about 550° C.

The system 100a includes a first hydrocracking unit 105. In some implementations, the first hydrocracking unit 105 includes a slurry hydrocracking unit (SHCU). The first hydrocracking unit 105 is configured to receive and process at least a portion of the vacuum residue stream 6. The first hydrocracking unit 105 is configured to produce an intermediate stream 13 and a slurry 14. In some implementations, the intermediate stream 13 includes naphtha components and gas oil components. In some implementations, the first hydrocracking unit 105 is configured to receive a first stream 9a that includes hydrogen to promote the production of the intermediate stream 13. In some implementations, the first stream 9a includes a catalyst, such as the nano- or microparticle size catalyst described previously.

The system 100a includes a second hydrocracking unit 107 (HCU). The second hydrocracking unit 107 is configured to receive and process the vacuum gas oil stream 5 and the intermediate stream 13 to produce a naphtha product 10 and a light ends product 18. Any oil that remains unconverted by the second hydrocracking unit 107 can be recycled to the first hydrocracking unit 105 as an unconverted oil stream 11. In some implementations, the unconverted oil stream 11 is combined with the vacuum residue stream 6 entering the first hydrocracking unit 105. In some implementations, the distillate stream 7 is combined with the vacuum gas oil stream 5 to form a hydrocracking feed stream 5a, and the hydrocracking unit 107 can receive and process the hydrocracking feed stream 5a and the intermediate stream 13 to produce the naphtha product 10, the light ends product 18, and the unconverted oil stream 11. In some implementations, the second hydrocracking unit 107 is configured to receive a second stream 9b that includes hydrogen to promote the production of the naphtha product 10 and the light ends product 18. In some implementations, the second stream 9b includes a catalyst, such as the heterogeneous fixed bed catalyst described previously.

The system 100a includes a pelletization unit 109. The pelletization unit 109 is configured to receive and process the slurry 14 to produce a pelletized product 16 (solid fuel). Any oil recovered by the pelletization unit 109 can be recycled to the first hydrocracking unit 105 as a recovered oil stream 15.

Figure 1B:
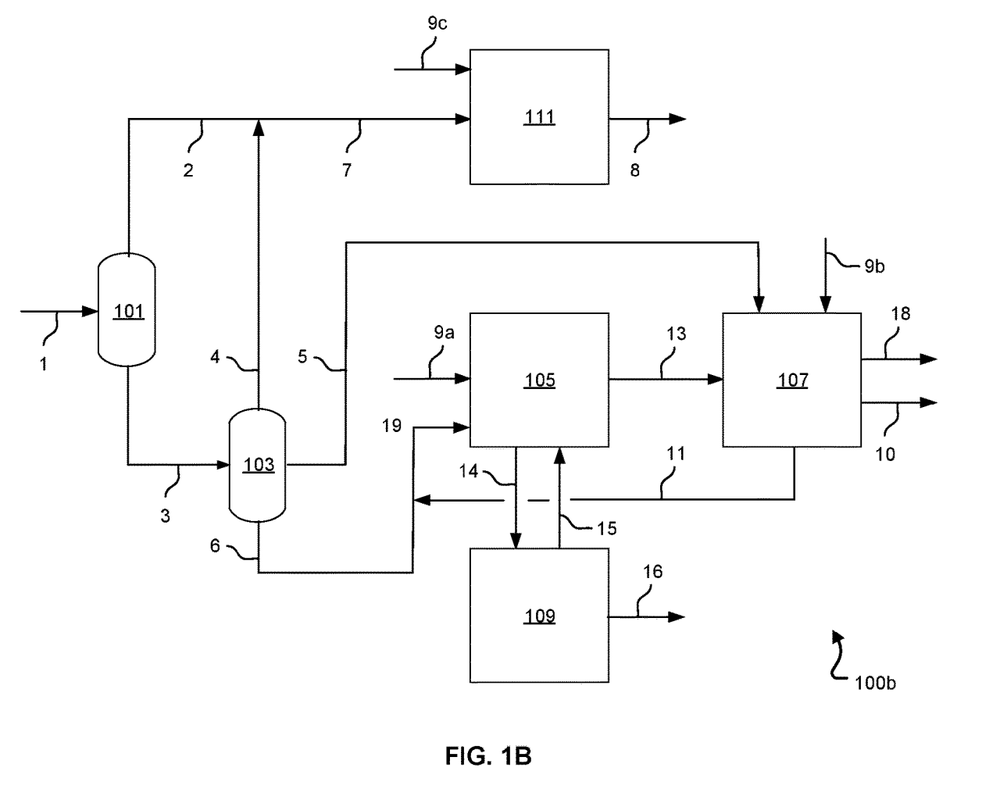
FIG. 1B is a schematic diagram of another example fuel oil conversion system.

FIG. 1B illustrates an example system 100b that can be used to convert fuel oil, for example, into fuel, petrochemical feedstock, or both. The system 100b can include at least the same components as system 100a (described previously). In some implementations, the system 100b includes a distillate hydrotreating unit 111 (DHT). The distillate hydrotreating unit 111 is configured to receive and process the flash distillate stream 2 and the vacuum distillate stream 4 to produce an ultra-low sulfur diesel product 8. As mentioned previously, in some implementations, the flash distillate stream 2 and the vacuum distillate stream 4 are combined to form a distillate stream 7. In some implementations, the distillate stream 7 is processed by the hydrotreating unit 111 to produce the ultra-low sulfur diesel product 8. In some implementations, the distillate hydrotreating unit 111 is configured to receive a third stream 9c that includes hydrogen to promote the production of the ultra-low sulfur diesel product 8. In some implementations, the third stream 9c includes a catalyst, such as the heterogeneous fixed bed catalyst described previously.

Figure 1C:
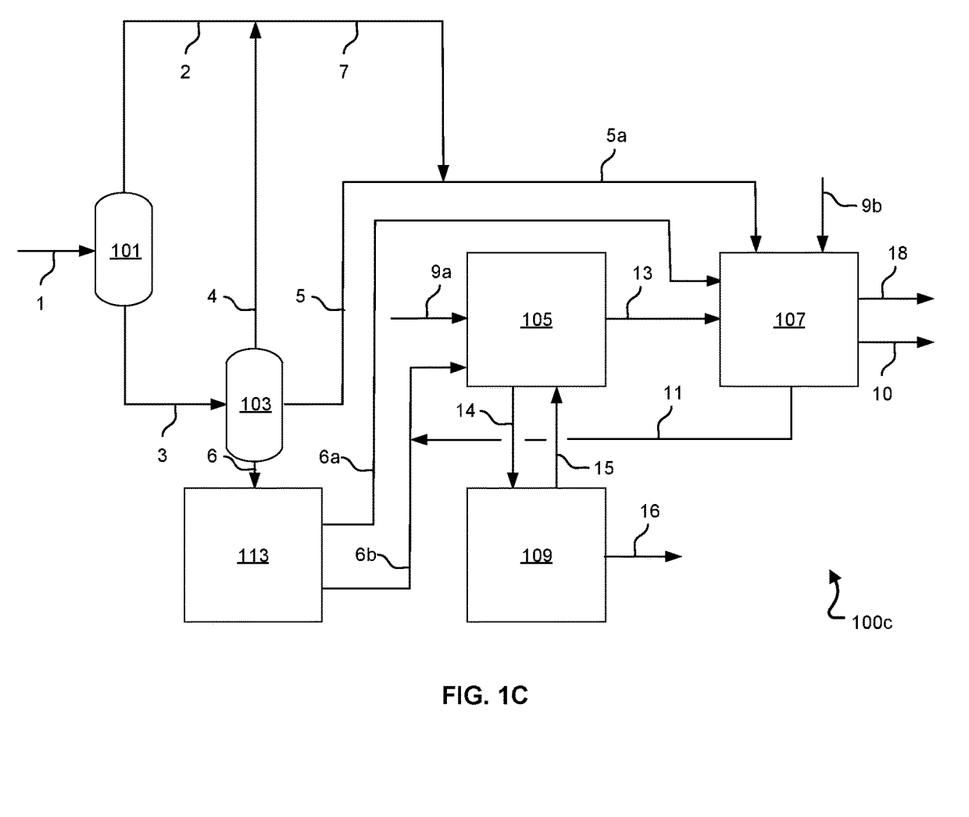
FIG. 1C is a schematic diagram of another example fuel oil conversion system.

FIG. 1C illustrates an example system 100c that can be used to convert fuel oil, for example, into fuel, petrochemical feedstock, or both. The system 100c can include at least the same components as system 100a (described previously). In some implementations, the system 100c includes a solvent de-asphalting unit 113 (SDA). The solvent de-asphalting unit 113 is configured to receive and process the vacuum residue stream 6 to produce a de-asphalted residue stream 6a and a pitch stream 6b. In some implementations, the de-asphalted residue stream 6a includes oil and resin. In some implementations, the first hydrocracking unit 105 is configured to receive and process the pitch stream 6b. In some implementations, the second hydrocracking unit 107 is configured to receive and process the de-asphalted residue stream 6a. In some implementations, the unconverted oil stream 11 is combined with the pitch stream 6b entering the first hydrocracking unit 105.

Figure 1D:
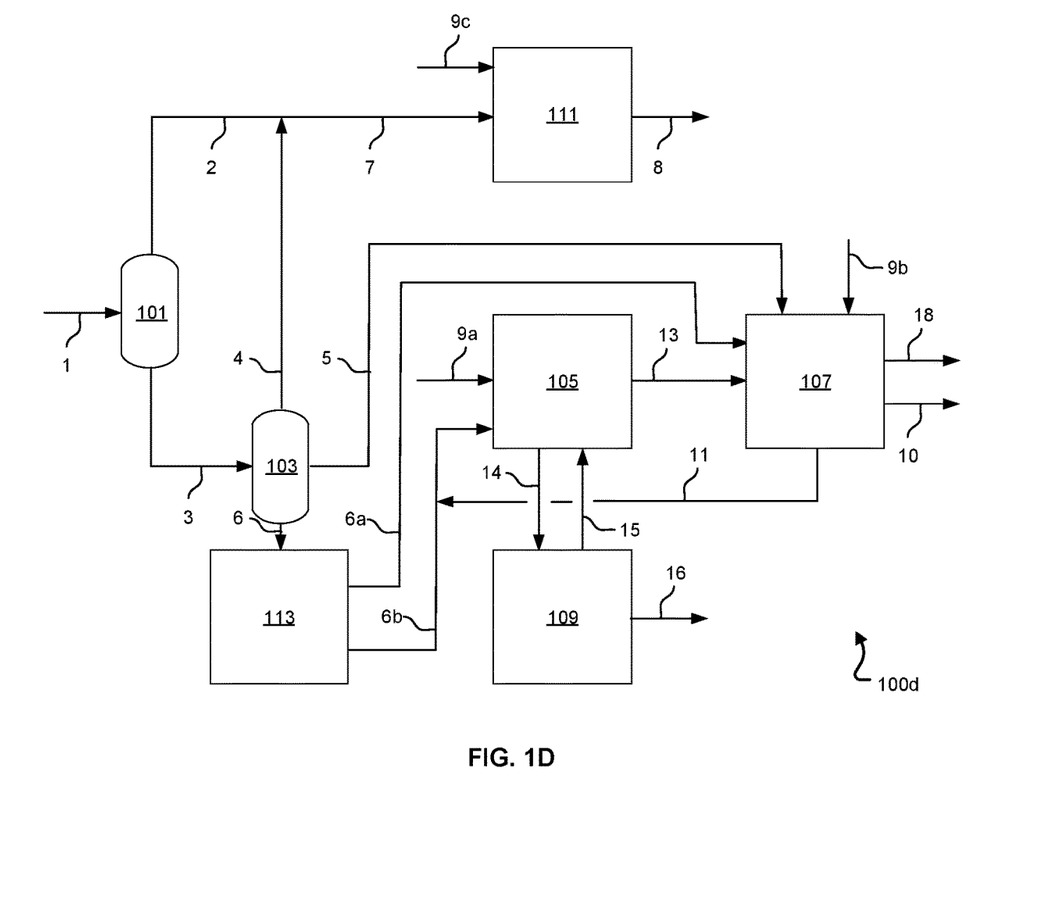
FIG. 1D is a schematic diagram of another example fuel oil conversion system.

FIG. 1D illustrates an example system 100d that can be used to convert fuel oil, for example, into fuel, petrochemical feedstock, or both. In some implementations, the system 100d includes at least the same components as system 100a (described previously). In some implementations, the system 100d includes the distillate hydrotreating unit 111, similar to system 100b (described previously). In some implementations, the system 100d includes the solvent de-asphalting unit 113, similar to system 100c (described previously).

Figure 2:
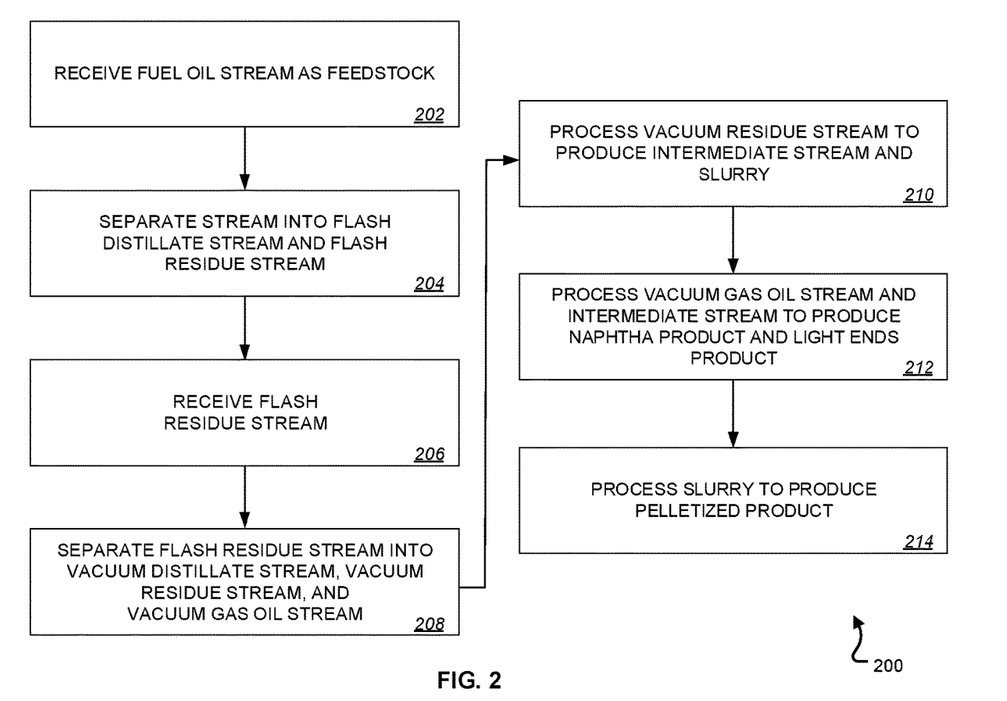
FIG. 2 is a flow chart of an example method for converting fuel oil.

FIG. 2 is a flow chart of an example method 200 for converting fuel oil. The method 200 can be implemented, for example, by any one of systems 100a, 100b, 100c, or 100d. At step 202, a stream including fuel oil (for example, stream 1) is received as feedstock. In some implementations, step 202 is implemented by a column (for example, the flash column 101).

At step 204, the stream 1 is separated into a flash distillate stream (for example, the flash distillate stream 2) and a flash residue stream (for example, the flash residue stream 3). In some implementations, step 204 is implemented by the flash column 101.

At step 206, the flash residue stream 3 is received. In some implementations, step 206 is implemented by a vacuum column (for example, the vacuum column 103).

At step 208, the flash residue stream 3 is separated into a vacuum distillate stream 4, a vacuum gas oil stream 5, and a vacuum residue stream 6. In some implementations, step 208 is implemented by the vacuum column 103.

At step 210, at least a portion of the vacuum residue stream 6 is processed to produce an intermediate stream (for example, the intermediate stream 13) and a slurry (for example, the slurry 14). In some implementations, the production of the intermediate stream 13 by the first hydrocracking unit 105 can be promoted by flowing a first stream including hydrogen (for example, the first stream 9a) to the first hydrocracking unit 105. As mentioned previously, in some implementations, the first stream 9a includes a catalyst, such as the nano- or micro-particle size catalyst. In some implementations, step 210 is implemented by a first hydrocracking unit (for example, the first hydrocracking unit 105).

In some implementations, the vacuum residue stream 6 can be processed to produce a de-asphalted residue stream (for example, the de-asphalted residue stream 6a) and a pitch stream (for example, the pitch stream 6b). In some implementations, the vacuum residue stream 6 is proceed by a solvent de-asphalting unit (for example, the solvent de-asphalting unit 113). In some implementations, the pitch stream 6b is processed by the first hydrocracking unit 105. In some implementations, the de-asphalted residue stream 6a is processed by the second hydrocracking unit 107.

At step 212, the vacuum gas oil stream 5 and the intermediate stream 13 are processed to produce a naphtha product (for example, the naphtha product 10) and a light ends product (for example, the light ends product 18). In some implementations, step 212 is implemented by a second hydrocracking unit (for example, the second hydrocracking unit 107). In some implementations, some oil does not get converted during step 212. In such implementations, an unconverted oil stream (for example, the unconverted oil stream 11) is produced from the second hydrocracking unit 107.

As mentioned previously, in some implementations, the flash distillate stream 2 and the vacuum distillate stream 4 are combined to form a distillate stream 7. In some implementations, the distillate stream 7 is combined with the vacuum gas oil stream 5 to form a hydrocracking feed stream 5a. In some implementations, the second hydrocracking unit 107 receives and processes the hydrocracking feed stream 5a and the intermediate stream 13 to produce the naphtha product 10 and the light ends product 18.

In some implementations, the production of the naphtha product 10 and the light ends product 18 by the second hydrocracking unit 107 is promoted by flowing a second stream including hydrogen (for example, the second stream 9b) to the second hydrocracking unit 107. As mentioned previously, in some implementations, the second stream 9b includes a catalyst, such as the heterogeneous fixed bed catalyst. In some implementations, any oil that remains unconverted by the second hydrocracking unit 107 is recycled to the first hydrocracking unit 105 (for example, as the unconverted oil stream 11). In some implementations, the unconverted oil stream 11 is combined with the vacuum residue stream 6 entering the first hydrocracking unit 105.

In some implementations, the distillate stream 7 is processed by a hydrotreating unit (for example, the hydrotreating unit 111) to produce ultra-low sulfur diesel (ULSD) (for example, the ultra-low sulfur diesel product 8). In some implementations, the production of the ultra-low sulfur diesel product 8 is promoted by flowing a third stream including hydrogen (for example, the third stream 9c) to the hydrotreating unit 111. As mentioned previously, in some implementations, the third stream 9c includes a catalyst, such as the heterogeneous fixed bed catalyst.

At step 214, the slurry 14 is processed to produce a pelletized product (for example, the pelletized product 16). In some implementations, step 214 is implemented by a pelletization unit (for example, the pelletization unit 109). In some implementations, processing the slurry 14 at step 214 includes recovering oil from the slurry 14. In such implementations, a recovered oil stream (for example, the recovered oil stream 15) is produced from the pelletization unit 109. In some implementations, any oil recovered by the pelletization unit 109 is recycled to the first hydrocracking unit 105 (for example, as the recovered oil stream 15).

EXAMPLE

Figure 3:
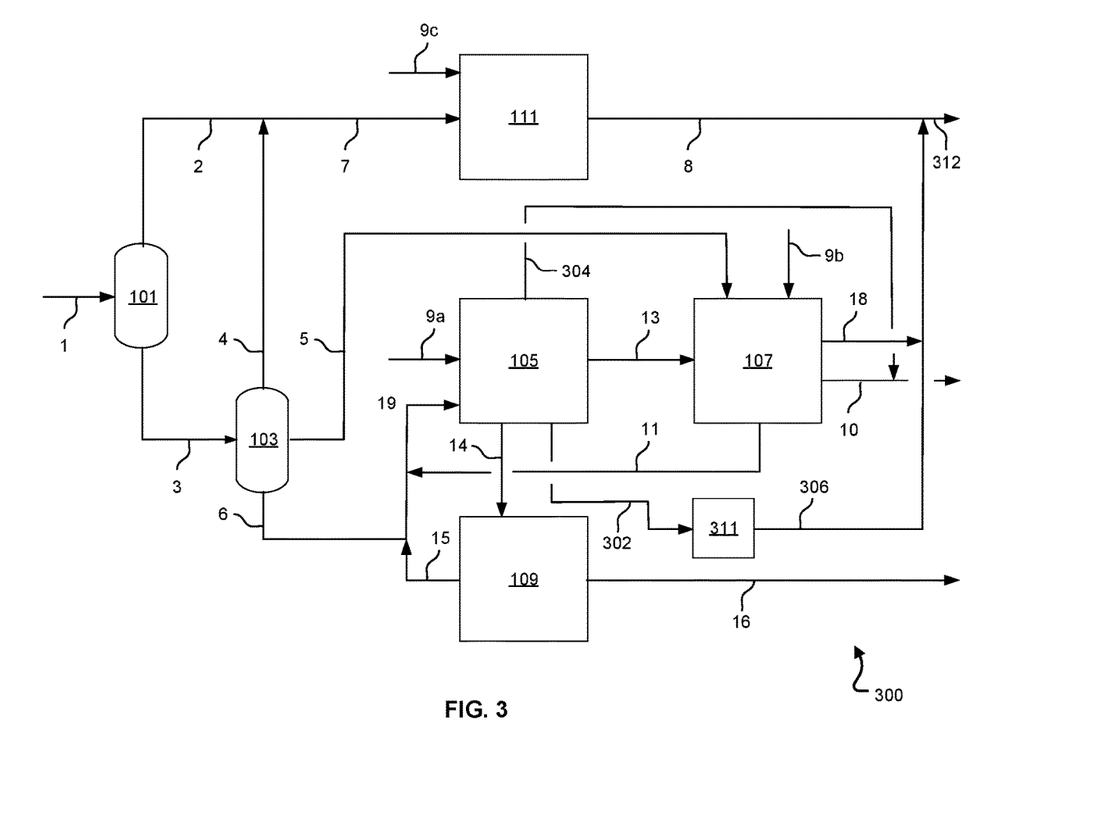
FIG. 3 is a schematic diagram of another example fuel oil conversion system.

FIG. 3 illustrates an example system 300 that was used to convert fuel oil. The system 300 included at least the same components as system 100b (described previously). The system 100b also included a high pressure hydrotreating unit 311 (HDHT). The HDHT 311 desulfurizes (that is, removes sulfur from) the diesel produced in the upstream hydrocracking unit 105, which includes a large amount of aromatics and a sulfur level greater than 500 ppm. In some implementations, the HDHT 311 operates at pressures greater than 60 bara.

An arbitrary volumetric unit (VU) is used in this example for the purpose of presenting volumetric throughput in the system 300. Stream 1 included a mixture of high sulfur fuel oil (HSFO) produced onsite (45 VU) and HSFO purchased from the market (55 VU), totaling to a total volume of 100 VU for stream 1. Stream 1 was received by the flash column 101. Stream 1 was separated by the flash column 101 into the flash distillate stream 2 (25 VU) and the flash residue stream 3 (75 VU).

The flash residue stream 3 (75 VU) was received by the vacuum column 103. The flash residue stream 3 was separated by the vacuum column 103 into the vacuum distillate stream 4 (1 VU), the vacuum gas oil stream 5 (22 VU), and the vacuum residue stream 6 (51 VU).

The vacuum residue stream 6 (51 VU) was received by the first hydrocracking unit 105. The vacuum residue stream 6 was processed by the first hydrocracking unit 105 to produce the intermediate stream 13 (21 VU), the slurry 14, the diesel stream 302 (23 VU), and the naphtha stream 304 (15 VU).

The slurry 14 was received by the pelletization unit 109. The slurry 14 was processed by the pelletization unit 109 to separate any unconverted oil and produce the pelletized product 16. The unconverted oil was recycled to the first 105 as the recovered oil stream 15 (3 VU).

The vacuum gas oil stream 5 (22 VU) and the 13 (21 VU) were received by the second 107. The vacuum gas oil stream 5 and the intermediate 13 were processed by the second hydrocracking unit 107 to produce the naphtha product 10 (10 VU) and the light ends product 18 (42 VU). The naphtha product 10 (10 VU) and the naphtha stream 304 (15 VU from the first 105) were combined (25 VU) and sent downstream to a refining process.

The flash distillate stream 2 and the vacuum distillate stream 4 were received by the distillate hydrotreating unit 111. The flash distillate stream 2 and the vacuum distillate stream 4 were processed by the distillate hydrotreating unit 111 to produce the ultra-low sulfur diesel product 8 (26 VU).

The diesel stream 302 (23 VU) was received by the HDHT 311. The diesel stream 302 was processed by the HDHT 311 to produce a treated diesel stream 306 (37 VU). The ultra-low sulfur diesel product 8 (26 VU from the 111), the 18 (42 VU from the second 107), and the treated diesel stream 306 (37 VU) were combined (105 VU) to form the ultra-low sulfur diesel product 312.

In this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

In this disclosure, "approximately" means a deviation or allowance of up to 10 percent (%) and any variation from a mentioned value is within the tolerance limits of any machinery used to manufacture the part. Likewise, "about" can also allow for a degree of variability in a value or range, for example, within 10%, within 5%, or within 1% of a stated value or of a stated limit of a range.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

While this disclosure contains many specific implementation details, these should not be construed as limitations on the subject matter or on what may be claimed, but rather as descriptions of features that may be specific to particular implementations. Certain features that are described in this disclosure in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Nevertheless, it will be understood that various modifications, substitutions, and alterations may be made. While operations are depicted in the drawings or claims in a particular order, this should not be understood as requiring that such operations be performed in the particular order shown or in sequential order, or that all illustrated operations be performed (some operations may be considered optional), to achieve desirable results. Accordingly, the previously described example implementations do not define or constrain this disclosure.

What is claimed is:

1. A system comprising:
   a fuel oil stream comprising thermally cracked residue;
   a flash column configured to receive the fuel oil stream as feedstock and separate the stream into a flash distillate stream and a flash residue stream;
   a vacuum column configured to receive the flash residue stream and separate the flash residue stream into a vacuum distillate stream, a vacuum gas oil stream, and a vacuum residue stream;
   a first hydrocracking unit configured to receive the vacuum residue stream, the first hydrocracking unit comprising a first catalyst comprising at least one of a Group VIII metal or a Group VIB metal, the first catalyst configured to convert at least a portion of the vacuum residue stream at a temperature in a range of from about 400 degrees Celsius (° C.) to about 490° C. and a hydrogen partial pressure in a range of from about 100 bar absolute (bara) to about 200 bara to produce an intermediate stream and a slurry;

a second hydrocracking unit configured to receive and process the vacuum gas oil stream and the intermediate stream, the second hydrocracking unit comprising a second catalyst comprising at least one of Group VIII metal and a Group VIB metal, the second catalyst configured to convert the vacuum gas oil stream and the intermediate stream at a temperature in a range of from about 360° C. to about 420° C. and a hydrogen partial pressure in a range of from about 70 bara to about 170 bara to produce a naphtha product, a light ends product, and an unconverted oil stream recycled to the first hydrocracking unit; and a pelletization unit configured to receive and process the slurry to produce a pelletized product and a recovered oil stream recycled to the first hydrocracking unit.

2. The system of claim 1, wherein the first hydrocracking unit is configured to receive a first stream comprising hydrogen to promote the production of the intermediate stream, and the second hydrocracking unit is configured to receive a second stream comprising hydrogen to promote the production of the naphtha product and the light ends product.

3. The system of claim 2, wherein the second hydrocracking unit is configured to receive and process the vacuum flash distillate stream and the atmospheric flash distillate stream.

4. The system of claim 2, comprising a solvent de-asphalting unit configured to receive and process the vacuum flash residue to produce a de-asphalted residue stream and a pitch stream, wherein the first hydrocracking unit is configured to receive and process the pitch stream, and the second hydrocracking unit is configured to receive and process the de-asphalted residue stream.

5. The system of claim 2, comprising a hydrotreating unit configured to receive and process the vacuum flash distillate stream and the atmospheric flash distillate stream to produce an ultra-low sulfur diesel product.

6. The system of claim 5, wherein the hydrotreating unit is configured to receive a third stream comprising hydrogen to promote the production of the ultra-low sulfur diesel product.

7. The system of claim 6, comprising a solvent de-asphalting unit configured to receive and process the vacuum flash residue to produce a de-asphalted residue stream and a pitch stream, wherein the first hydrocracking unit is configured to receive and process the pitch stream, and the second hydrocracking unit is configured to receive and process the de-asphalted residue stream.

8. A method comprising:
receiving, as feedstock, a fuel oil stream comprising thermally cracked residue;
separating the fuel oil stream into a flash distillate stream and a flash residue stream;
receiving the flash residue stream;
separating the flash residue stream into a vacuum distillate stream, a vacuum gas oil stream, and a vacuum residue stream;
processing at least a portion of the vacuum residue stream in a first hydrocracking unit with a first catalyst at a temperature in a range of from about 400 degrees Celsius (° C.) to about 490° C. and a hydrogen partial pressure in a range of from about 100 bar absolute (bara) to about 200 bara to produce an intermediate stream and a slurry, the first catalyst comprising a Group VIII metal, a Group VIB metal, or a combination thereof;

processing the vacuum gas oil stream and the intermediate stream in a second hydrocracking unit with a second catalyst at a temperature in a range of from about 360° C. to about 420° C. and a hydrogen partial pressure in a range of from about 70 bara to about 170 bara to produce a naphtha product and a light ends product, the second catalyst comprising a Group VIII metal and a Group VIB metal; and processing the slurry to produce a pelletized product.

9. The method of claim 8, wherein:
processing the vacuum gas oil stream and the intermediate stream is performed by a second hydrocracking unit and results in producing an unconverted oil stream;
processing the slurry results in producing a recovered oil stream; and
the method comprises recycling the unconverted oil stream and the recovered oil stream to a first hydrocracking unit, wherein processing at least a portion of the vacuum residue stream is performed by the first hydrocracking unit.

10. The method of claim 9, comprising:
promoting the production of the intermediate stream by flowing a first stream comprising hydrogen to the first hydrocracking unit; and
promoting the production of the naphtha product and the light ends product by flowing a second stream comprising hydrogen to the second hydrocracking unit.

11. The method of claim 10, comprising processing, by the second hydrocracking unit, the vacuum flash distillate stream and the atmospheric flash distillate stream.

12. The method of claim 10, comprising:
processing, by a solvent de-asphalting unit, the vacuum flash residue to produce a de-asphalted residue stream and a pitch stream; and
processing, by the second hydrocracking unit, the de-asphalted residue stream.

13. The method of claim 12, wherein processing, by the first hydrocracking unit, at least the portion of the vacuum flash residue stream comprises processing, by the first hydrocracking unit, the pitch stream.

14. The method of claim 10, comprising processing, by a hydrotreating unit, the vacuum flash distillate stream and the atmospheric flash distillate stream to produce an ultra-low sulfur diesel product.

15. The method of claim 14, comprising promoting the production of the ultra-low sulfur diesel product by flowing a third stream comprising hydrogen to the hydrotreating unit.

16. The method of claim 15, comprising:
processing, by a solvent de-asphalting unit, the vacuum flash residue to produce a de-asphalted residue stream and a pitch stream; and
processing, by the second hydrocracking unit, the de-asphalted residue stream.

17. The method of claim 16, wherein processing, by the first hydrocracking unit, at least the portion of the vacuum flash residue stream comprises processing, by the first hydrocracking unit, the pitch stream.

* * * * *